United States Patent
Capurro

(10) Patent No.: US 10,664,810 B2
(45) Date of Patent: May 26, 2020

(54) METHOD AND APPARATUS FOR PROVIDING AN ELECTRONIC TRANSACTION GATEWAY

(71) Applicant: Easy Payment Gateway, Ltd., Gibraltar (GI)

(72) Inventor: Alexzandre Anthony Capurro, Gibraltar (GI)

(73) Assignee: EASY PAYMENT GATEWAY, LTD., Gibraltar (GI)

( * ) Notice: Subject to any disclaimer, the term of this patent is extended or adjusted under 35 U.S.C. 154(b) by 694 days.

(21) Appl. No.: 14/836,661

(22) Filed: Aug. 26, 2015

(65) Prior Publication Data
US 2016/0358130 A1    Dec. 8, 2016

(30) Foreign Application Priority Data
Jun. 4, 2015   (EP) .................................... 15170716

(51) Int. Cl.
*G06Q 20/02*   (2012.01)
*G06Q 10/06*   (2012.01)
(Continued)

(52) U.S. Cl.
CPC .......... *G06Q 20/027* (2013.01); *G06Q 10/06* (2013.01); *G06Q 10/0633* (2013.01);
(Continued)

(58) Field of Classification Search
CPC ..................................................... G06Q 20/02
See application file for complete search history.

(56) References Cited

U.S. PATENT DOCUMENTS

| 8,494,934 B2 | 7/2013 | Atkinson et al. |
| 2002/0184610 A1* | 12/2002 | Chong ...................... G06F 8/20 717/109 |

(Continued)

FOREIGN PATENT DOCUMENTS

| WO | 2008005018 A2 | 1/2008 |
| WO | 2015044162 A1 | 4/2015 |
| WO | 2015051074 A1 | 4/2015 |

OTHER PUBLICATIONS

European Patent Office, Extended European Search Report, Application No. 15170716.3, dated Nov. 9, 2015, 6 pages.

*Primary Examiner* — Kurtis Gills
(74) *Attorney, Agent, or Firm* — Quarles & Brady LLP

(57) ABSTRACT

In one embodiment, the present invention is a transaction gateway apparatus for effecting a transaction request, the apparatus being configured to receive transaction request data, select, based on said transaction request data, one of a plurality of workflows to be performed that defines transaction data route between said apparatus and a transaction service provider specified in said workflow, wherein said apparatus is configured to: display a user interface defining a workspace within which a user can configure a workflow; access a plurality of modules, each defining respective service provider functions, a plurality of rule sets defining conditions to be fulfilled for a transaction data route to follow a specified path of a workflow; display selectable data representative of said modules and rule sets in said work space; enable a user to configure a visual representation of a workflow by: selecting a transaction type or parameter to be associated with a workflow; selecting combinations of one or more modules and rule sets to be included in said workflow, said apparatus being configured to display said selected combination in said work space; selectively defining visual links between said modules and/

(Continued)

or rule sets to define respective workflow paths; and convert a user-configured workflow to an executable transaction data route for execution in the event that transaction request data received by said apparatus is determined thereby to match a transaction type or parameter associated with said workflow.

10 Claims, 10 Drawing Sheets

(51) Int. Cl.
    *G06Q 30/06*         (2012.01)
    *G06Q 20/40*         (2012.01)

(52) U.S. Cl.
    CPC ... *G06Q 10/06316* (2013.01); *G06Q 20/4014* (2013.01); *G06Q 30/0613* (2013.01)

(56) References Cited

U.S. PATENT DOCUMENTS

| | | | |
|---|---|---|---|
| 2003/0149714 A1* | 8/2003 | Casati | G06Q 10/10 |
| | | | 718/100 |
| 2004/0187089 A1* | 9/2004 | Schulz | G06Q 10/06 |
| | | | 717/101 |
| 2005/0027585 A1* | 2/2005 | Wodtke | G06Q 10/06316 |
| | | | 705/7.26 |
| 2005/0093881 A1* | 5/2005 | Okita | G06Q 10/06 |
| | | | 345/589 |
| 2012/0209630 A1 | 8/2012 | Ihm et al. | |
| 2014/0089113 A1* | 3/2014 | Desai | G06O 20/322 |
| | | | 705/16 |
| 2015/0186871 A1* | 7/2015 | Laracey | G06Q 20/3278 |
| | | | 705/41 |
| 2016/0063404 A1* | 3/2016 | Doerr | G06Q 10/0633 |
| | | | 705/7.27 |

* cited by examiner

METHOD AND APPARATUS FOR PROVIDING AN ELECTRONIC TRANSACTION GATEWAY

CROSS-REFERENCE TO RELATED APPLICATIONS

This application claims priority from European Patent Application No. 15170716.3, filed Jun. 4, 2015, and incorporated herein.

STATEMENT REGARDING FEDERALLY-SPONSORED RESEARCH

N/A

BACKGROUND OF THE INVENTION

This invention relates generally to a method and apparatus for providing an electronic transaction gateway that provides a single gateway to multiple transaction methods.

A payment gateway is an e-commerce application service provider that authorises transactions such as credit card payments for e-businesses, on-line retailers, etc and is intended to provide the equivalent of a physical point of sale (POS) terminal located in most retail outlets. Payment gateways protect credit card details by encrypting sensitive details to ensure that information is passed securely between the customer and the merchant and also between the merchant and the payment processor.

There are many different payment solutions and services available for use, and if a merchant wishes to use one of those solutions or services, it is necessary to integrate a dedicated API into their transaction management system in order to provide an interface between their system and the selected solution or service. Thus, if multiple solutions and services are required to be supported, each one requires a respective integration of a dedicated API into the merchant's transaction management system.

The difficulties and cost associated with organising and maintaining multiple payment solutions and services within a transaction management system, not to mention the processing overhead required for their adequate operation, has resulted in many merchants simply opting for a single, or a very limited number, of payment solutions and services to be supported within their system. On the other hand, this can be unnecessarily limiting, both to the customer and the merchant, in terms of the solutions and services that could be offered. It would, therefore, be desirable to provide an apparatus and method that enables a merchant to avail themselves of multiple transaction solutions and services, without the need for each selected solution or service to be individually integrated into their transaction management system.

SUMMARY OF THE INVENTION

It is an object of aspects of the present invention to address at least some of these issues and, in accordance with one aspect of the present invention, there is provided a transaction gateway apparatus for effecting a transaction request, the apparatus being configured to receive transaction request data, select, based on said transaction request data, one of a plurality of workflows to be performed that defines transaction data route between said apparatus and a transaction service provider specified in said workflow, wherein said apparatus is configured to:

display a user interface defining a workspace within which a user can configure a workflow;

access a plurality of modules, each defining respective service provider functions, a plurality of rule sets defining conditions to be fulfilled for a transaction data route to follow a specified path of a workflow;

display selectable data representative of said modules and rule sets in said work space;

enable a user to configure a visual representation of a workflow by:

selecting a transaction type or parameter to be associated with a workflow;

selecting combinations of one or more modules and rule sets to be included in said workflow, said apparatus being configured to display said selected combination in said work space;

selectively defining visual links between said modules and/or rule sets to define respective workflow paths; and convert, in substantially real time, a user-configured workflow to an executable transaction data route for execution in the event that transaction request data received by said apparatus is determined thereby to match a transaction type or parameter associated with said workflow.

The user interface may be configured to display user-configured workflow as a graphical image. At least some of said rule sets may have a priority value associated therewith, and wherein said apparatus may be configured to identify two or more contradictory rule sets in workflow. In this case, the apparatus may be configured to select, based on the priority values of said contradictory rule sets, one of said contradictory rule sets for execution in said workflow; and/or generate and display an error message in the event that it identifies two or more contradictory rule sets in a workflow.

In accordance with an exemplary embodiment of the invention, the apparatus may be configured to enable a user to define one or more rule sets. In this case, the apparatus may be configured to enable a user to define one or more rule sets by displaying data representative of selectable conditional statements, and enabling a user to select one or more conditional statements and enter specified parameters in respect thereof.

The apparatus may comprise a processing engine and a back office module, wherein said back office module is configured to provide said user interface and said processing engine is configured to perform said conversion of a user-configured workflow into executable transaction data route code. The processing engine and said back office module may be communicably coupled for two-way communication via a REST service. In an exemplary embodiment, pre-defined said rule sets and said modules may be stored in a database accessible by said processing engine and/or said back office module.

According to another aspect of the present invention, there is provided a transaction management system comprising a user transaction interface for receiving transaction request data, and a transaction gateway apparatus substantially as described above, said transaction gateway apparatus being configured to effect a transaction via a selected one of a plurality of transaction service providers, in accordance with a transaction data route defined by a workflow associated with a parameter of said transaction request data.

The user transaction interface and said transaction gateway apparatus may be communicably coupled for two-way communication via a REST service. The transaction gateway apparatus may be configured to perform a user authentication operation in response to authentication data received from said user transaction interface.

In accordance with yet another aspect of the present invention, there is provided a method of generating a transaction data route for directing and effecting a transaction request in apparatus substantially as described above, the method comprising:

displaying a user interface defining a workspace within which a user can configure a workflow;

accessing a plurality of modules, each defining respective service provider functions, a plurality of rule sets defining conditions to be fulfilled for a transaction data route to follow a specified path of a workflow;

displaying selectable data representative of said modules and rule sets in said work space;

enabling a user to configure a visual representation of a workflow by:

selecting a transaction type or parameter to be associated with a workflow;

selecting combinations of one or more modules and rule sets to be included in said workflow, said apparatus being configured to display said selected combination in said work space;

selectively defining visual links between said modules and/or rule sets to define respective workflow paths; and converting a user-configured workflow to an executable transaction data route for execution in the event that transaction request data received by said apparatus is determined thereby to match a transaction type or parameter associated with said workflow.

Aspects of the present invention extend to a computer program element comprising computer code means to make a computer execute a method substantially as described above.

Thus, exemplary aspects of the present invention alleviate the above-mentioned problems and enable the integration into a transaction management system of a single gateway function in which workflows can be configured and reconfigured in real time (and on-line) to direct transaction data flow to be directed to one or other transaction solution or service, depending on a type or parameter of the requested transaction. The EPG platform only requires one simple integration. Once integrated into the platform all other third party integrations are effected by the gateway apparatus. The merchant can very easily manage each and every service and payment solution via an exemplary embodiment of an electronic gateway platform using a technically innovative back office that can be designed for use by non-technical operatives. In various exemplary embodiments of the invention:

Solutions can be turned on or off in real time without any disruption to the services provided.

Solutions can be configured to be shown to customers based on their country and currency.

Limits can be applied to the different solutions for both payins and payouts, all in substantially real time.

Merchant accounts with each service/payment solution can be maintained, all from one place. This means that merchants are able to configure individual payment solutions and services based on any combination of rules they want, specifically for each cashier/check out they have or even down to a customer level, all in substantially real time from the above-mentioned 'back office'.

These and other aspects of the present invention will be apparent from the following specific description in which embodiments of the present invention are described, by way of examples only, and with reference to the accompanying drawings.

DESCRIPTION OF THE INVENTION

The electronic gateway system, apparatus and methods described herein solve the technical problem of how to accomplish the on-line configuration (and/or reconfiguration) of transaction data routing in substantially real time, without the need to go off-line for the purposes of compilation. In particular, a system according to an exemplary embodiment of the present invention provides a single, configurable electronic gateway to multiple transaction methods and/or payment solutions from a single platform, wherein parameters and conditions in respect of each transaction route can be selectively and independently configured and/or reconfigured, without the need to redeploy any software code.

Figure 1:
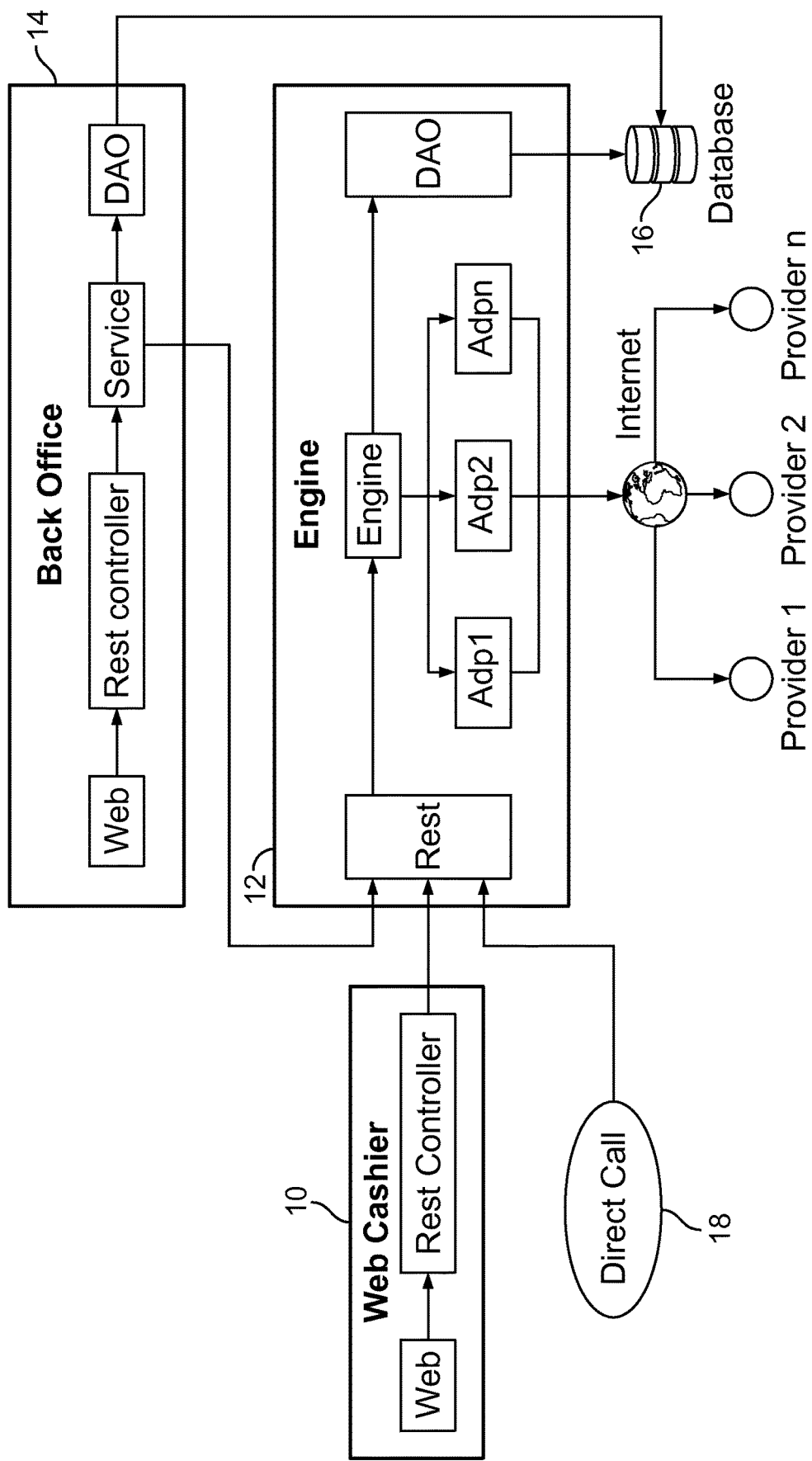
FIG. 1 is a schematic block diagram illustrating a transaction management system including a gateway application according to an exemplary embodiment of the present invention.

Referring to FIG. 1 of the drawings, a transaction application including an electronic gateway system according to an exemplary embodiment of the present invention can be considered to comprise four principal components, namely a Web Cashier 10, a Payment Engine 12, a Back Office 14 and a Database 16.

Figure 1A:
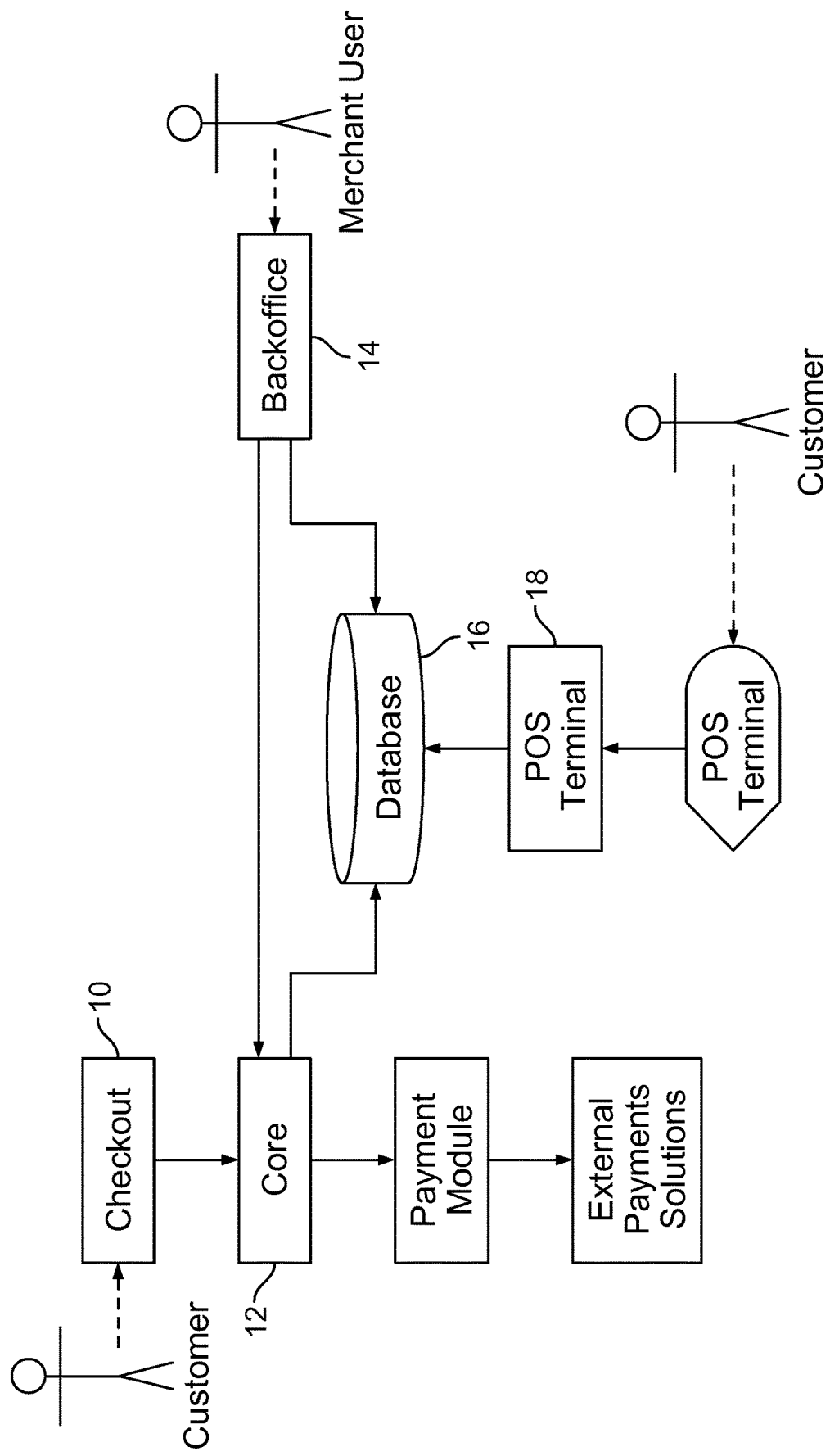
FIG. 1A is a schematic block diagram illustrating a general overview of a transaction management platform including apparatus according to an exemplary embodiment of the present invention.

Referring to FIG. 1A of the drawings, it can be seen that the platform according to an exemplary embodiment of the present invention can be provided in the form of a self-contained package that can be directly accessed by the merchant via their existing platform, all through a single API integration rather than one integration per payment solution or service offered, as is currently required with prior art gateway systems.

In summary (and as will be described in more detail herein), the Web Cashier 10 is a stand alone piece of software that takes the players/customers request (for example a deposit) from a Merchant's website, verifies the data being passed, communicates with the appropriate service or payment method in its specific API, receives in turn an approved or declined communication and records the data of the entire process and the outcome (back office).

Whereas, typically, companies have integrated their cashier/website to e-wallets on a one-to-one basis this is actually time consuming and therefore also costly. On the other hand, a platform according to an exemplary embodiment of the present invention gives the Merchant the ability to take payments both online and via POS via a number of different leading payment methods as well as accessing multiple services such as ID or Address verification services as a package, crucially without any additional development.

Additionally, the platform may be configured to cater for a Merchant's planning & reporting needs by including a fully functional back office that records every individual transaction and associated data. This recorded data can be looked at a fine detail level per transaction if need be but can also be represented as consolidated reports, tables and graphs. The tool may also allow for the Merchant to create their own reports and graphs from the base data if required.

Referring back to FIG. 1 of the drawings, as shown, the Web Cashier 10 and the Back Office modules are communicably coupled to the Payment Engine 12 by means of a respective REST service. REST stands for Representational State Transfer and relies on stateless, client-server, cacheable communications protocol, wherein in this case (and virtually all other cases) the HTTP protocol is used. REST will be familiar to a person skilled in the art as an architectural style for designing networked applications, the idea being that, instead of using complex mechanisms to connect between machines, simple HTTP is used to make calls between machines. The respective REST services provided in the above-mentioned modules use HTTP requests to post data (create and/or update), read data (e.g. make queries), and (where appropriate) delete data.

The Payment Engine 12 and the BACK Office 14 are connected to the database 16 via a DAO (Data Access Objects) application program interface, which will be known to a person skilled in the art.

The Web Cashier 10 is provided in systems where it is required to provide an automated service (e.g. on-line) with no user presence, whereas the Direct Call function 18, or Direct Connection application program interface (DC-API), may be used in the case of a 'normal' cashier or point-of-sale terminal. A system may include one or both of these options, according to application and user preference, and the present invention is not intended to be in any way limited in this regard.

Figure 2:
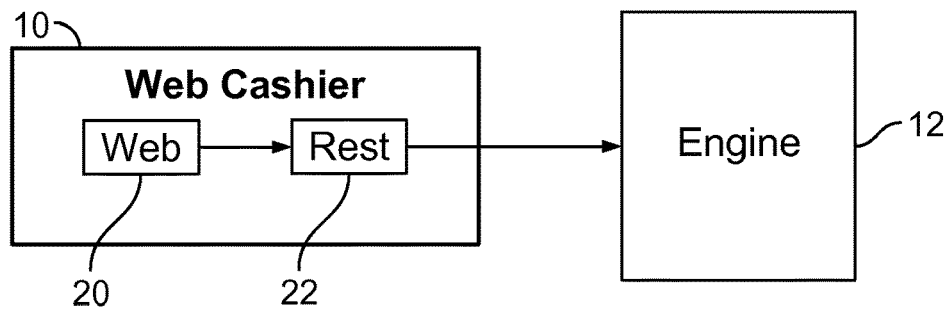
FIG. 2 is a schematic block diagram of an exemplary Web Cashier module for use in the system of FIG. 1.

The Web Cashier 10 can be considered to be a top level element of the overall system, and provides an interface for the merchant to allow a final user (i.e. customer) to perform payments and various other operations (e.g. looking at past transactions). The Web Cashier is, in itself, a complete MVC (Model-View-Controller) application that uses the Engine 12 as a 'bridge' to access the database 16 and retrieve the data required to present the required information, for example, payment methods available for a particular configuration. Referring to FIG. 2 of the drawings, the structure of the Web Cashier 10, and the manner in which it communicates with the other modules of the system, is exemplified.

As illustrated schematically, web services 20 are used within the Web Cashier 10 to provide the required flexibility for creating complex flows on demand (as will be described in more detail later). The Web Cashier 10 communicates with a REST layer 22 to perform the required operations over the engine 12 using a middle layer. The Engine 12 will be covered in more detail later.

The Web Cashier 10 has four principal use modes in its standard configuration, namely Deposit, Withdraw, Payment Management and Pending Withdrawals. However, it will be appreciated that, in addition to these four default modes, other processes may also be handled by the Web Cashier, including, for example, Payment method list retrieval, session expiration handling, identification of the browser in which the application is being displayed, and localisation. However, the transaction processes themselves are delegated to the Engine 12, such that the Web Cashier is a relatively simple presentation layer.

In order to invoke the Web Cashier, the merchant needs to perform some internal calls to retrieve a security token to be used during the life of the Web Cashier, by authenticating the electronic gateway platform using secure connections and encrypted passwords as well as a known list of merchant's server IP addresses (as will be described in more detail later). This is performed in order to secure the connection and avoid unauthorised user alteration in the configuration.

During ongoing use of the system, when the cashier services are started (i.e. a transaction is required to be performed), the Web Cashier requests selected information from the Engine 12. This information comprises basic configuration information essential to the overall operation of the system, especially in the case of an error.

The following information may be required initially, in case there are any errors before more in-depth information has been loaded:

A list of merchants;

A default error page to show the customer when they are connected to a particular merchant;

An overall default error page to indicate to the customer that no session information can be found; and For each of the merchants, the skin name associated with that merchant.

Of course, it will be appreciated that at least for some systems, alternative or additional initial information may be required for adequate operation of the system, and the present invention is not necessarily intended to be limited in this regard. The same information may be (periodically or otherwise) fetched from the Engine to keep abreast of any changes that have occurred since initial start-up.

A pre-login call may be performed by the merchant for initial authentication purposes, and comprises the first call to be made from the Engine to the merchant. The call may contain any or all of the following information:

The identifier for the Merchant.

The customer's first name.

The customer's last name.

The customer's registration date.

The language that the customer shall transact in.

The area of the hosted flow that shall be shown to the customer. e.g. Deposit to list the deposit pages.

Currency.

Country of the customer.

A checksum of the call.

A unique identifier for the client session. It is advised that this does not reference the session id automatically maintained by java or any other language, rather it may be a unique random string that is non sequential that is attached to the clients session.

The address of the customer—optional but may be required for given installations;

Any account comments attached to the clients account—optional;

Payment Solution—A payment solution to pass the customer to. If the operation is not "DEPOSIT" or "WITHDRAWAL" a warning shall be issued—optional;

Amount—A numeric value in the currency of the account that is being logged in. If the amount is filled in and the operation is not set to "DEPOSIT" or "WITHDRAWAL" an error shall be returned in the response. If this value is filled then and the operation is specified correctly then the customer will be making a quick deposit or withdrawal. This is expected to be used in the case of retail transactions primarily. This basically means that the amount field would be pre-populated and the relevant deposit/withdrawal page template would be shown.

The customer's account Id

Any extra details that are wished to be displayed alongside the customer's transaction in the real time reporting sections.

Balance—optional however if the customer's balance needs to be shown within the hosted flow, then it will be compulsory.

Version—i.e. the version of the API call being called (to ensure that the result format received is compatible with the version being used).

Thus, when the user wants to open the cashier, the Merchant will perform a call to the Internal API that is in the Payment Engine with the user information (User Id, User IP, Country, Currency, Language . . . ), the internal API will create a registry record with this information and also generate a unique one time use token, that will be provided to the Merchant. The merchant will be able to redirect the user to the cashier using this token (that will be an encrypted session token linked with the user IP). When the Web Cashier is invoked, the first thing to do will be to extract the token, check that the user is coming from the correct IP, and then retrieve the sensitive data that is stored in the system. Provision may also be made to make sure that the request is not coming from the user machine that is why the merchant previously performed the request token operation.

These tokens are stored in the database and are linked to the user configuration (User Id, IP, Country, Currency, Language . . . ). The cashier uses this information to present the relevant pages and operations available to the customer based on the configuration returned.

Figure 3:
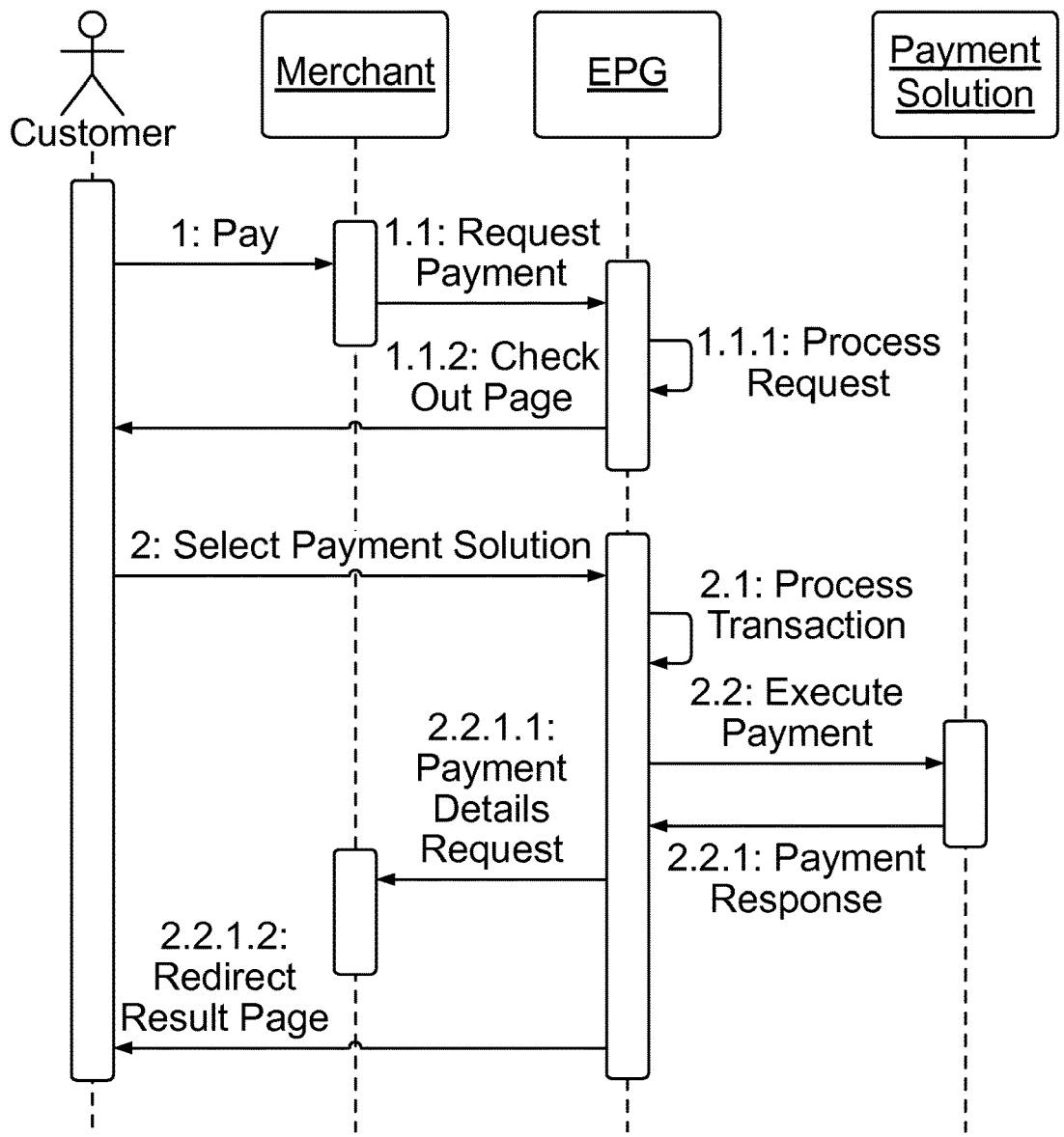
FIG. 3 is a schematic diagram illustrating transaction data flow in the system of FIG. 1.

FIG. 3 shows a sequence diagram of how the merchant requests a cashier instance. After the initial call the Engine should redirect the customer to a URL within the cashier; passing the pre-login call identifier associated with this customer. Example: "http://merchanturl.cashier.com/cashier?token=2342ksdfls"

The customer is redirected back one last time to the EPG Engine, this time passing the SessionId that was initially returned after the pre-login call, this should be read from the customer's session not from a look up of what the call was. The sessionId shall be used as confirmation that the customer is indeed who they say they are and that no third party has interfered in the communication between the two servers (the merchant server and the EPG server).

This method of dual secrets allows for secure login without interference via a third party. It also prevents the redirection URL from being used by any other customer as there is a dependency on the session.

The EPG Cashier can be loaded inside an iframe or completely stand alone. The cashier framework is 100% customisable by the merchant and is also mobile friendly and responsive.

Configuration Retrieval

If the appropriate configuration for the merchant is already cached and the cache is within time then no call will be made to the Engine for the merchant config. If the details aren't cached in memory, or are expired, then a call will be made to the Engine for the relevant merchant details, passing the merchantId, the currency and the country. This call will probably be made over REST. Once the response is received, it will be cached in memory for the allotted time. Note the call only retrieves the config for the Merchant in the current Country and Language of the customer; this is so that we don't have to load unnecessary data into the system.

Configuration Response

A successful result may have the following details.

The merchant Id that this configuration references.

The currency that this configuration references.

The country that this configuration references.

A list of payment solutions available for this merchant, country and currency combination. For each of these payment solutions we need the following information for both deposit and withdrawals:

Is it allowed (note that if a currency isn't allowed for either deposits or withdrawals it should be omitted from this list completely)

The maximum transaction that can be made.

The minimum transaction that can be made.

Is currency conversion allowed for this method?

Is currency conversion required for this method?

What currency can it be converted to?—required when the currency conversion is an option?

What charge is there for a currency conversion?—required only when currency conversion is an option;

Any pending withdraws.

Cashier look and feel configuration.

If the response is not successful, then the customer may be redirected to the corresponding error page with a predetermined error message.

As explained above, the principal technical problem sought to be addressed by various aspects of the present invention is how to accomplish the on-line configuration (and/or reconfiguration) of transaction data routing in substantially real time, without the need to go off-line for the purposes of compilation. In particular, a system according to an exemplary embodiment of the present invention provides a single, configurable electronic gateway to multiple transaction methods and/or payment solutions from a single platform, wherein parameters and conditions in respect of each transaction route can be selectively and independently configured and/or reconfigured, without the need to redeploy any software code. This is achieved in this exemplary embodiment of the present invention by the use of so-called workflows, which essentially comprise a 'roadmap' that tells the Engine what to do and the data path to follow for every given transaction request. Users are able to configure and reconfigure such workflows and can, by the very nature of the methodology proposed herein, be as simple or as complex as the application requires. The user interface provided by various aspects of the present invention is relatively simple to use, and in one exemplary embodiment, a user can simply 'drag' modules onto the screen and link them up to other modules to create a visual representation of the desired workflow. In addition, users can link modules and flows to rule sets, such that a workflow can be created with multiple internal routes based on decisions and outcomes of defined rule sets.

Figure 4:
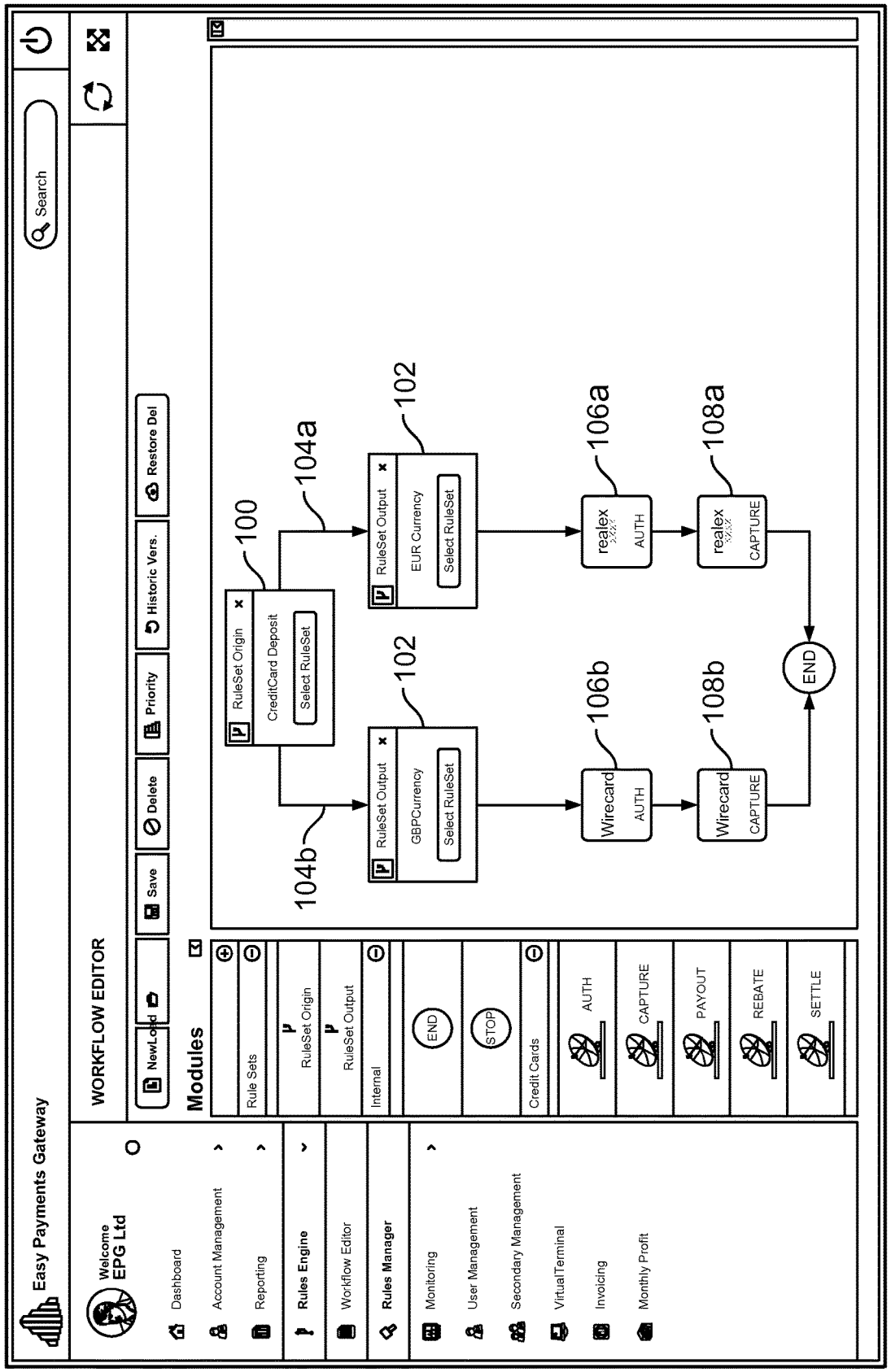
FIG. 4 is a screen shot illustrating the operation of a workflow editor for use in apparatus according to an exemplary embodiment of the present invention.

FIG. 4 illustrates a screen shot of a workflow being created using an exemplary embodiment of the present invention. It can be seen that the workflow creation process starts with a rule set origin module 100, which corresponds to a particular transaction request (in this case, a credit Card Deposit). Two rule set blocks 102 are provided in the defined rule set, and 'linked' to the rule set origin module by respective arrows 104a, 104b. It can be seen that, in this particular workflow, there are two currency rules, the outcome of which defines the external payment service to be used for the transaction. Thus, if the transaction is in GBP, the workflow follows the left-hand flow and is linked to the authorisation and capture modules 106b, 108b of a first service provider. If the transaction is in Euros, the workflow follows the right-hand flow and is linked to the authorization and capture modules 106a, 108a of a second service provider.

Users can create and store their workflows, after which they can access a workflow revision history to revert any changes made in the future, as well as restoring deleted flows. Workflow priorities may be assigned to each of the workflows such that, if a workflow, or rule therein, clashes with another, the engine knows which of the two workflows is to take precedence and prevent internal errors or unintentional performance of a lower priority workflow.

As previously explained, there are many merchants that need to use a third party supplier for hosting payments or even storage of customer data. These merchants are sometimes unable to add any new services or payment solutions, or they depend completely on a single third party service. Aspects of the present invention allow merchants to relatively easily use any service or solution as part of a transaction route (or "workflow"), without the need to involve third party technical support and without the need for any system redevelopment.

Figure 5:
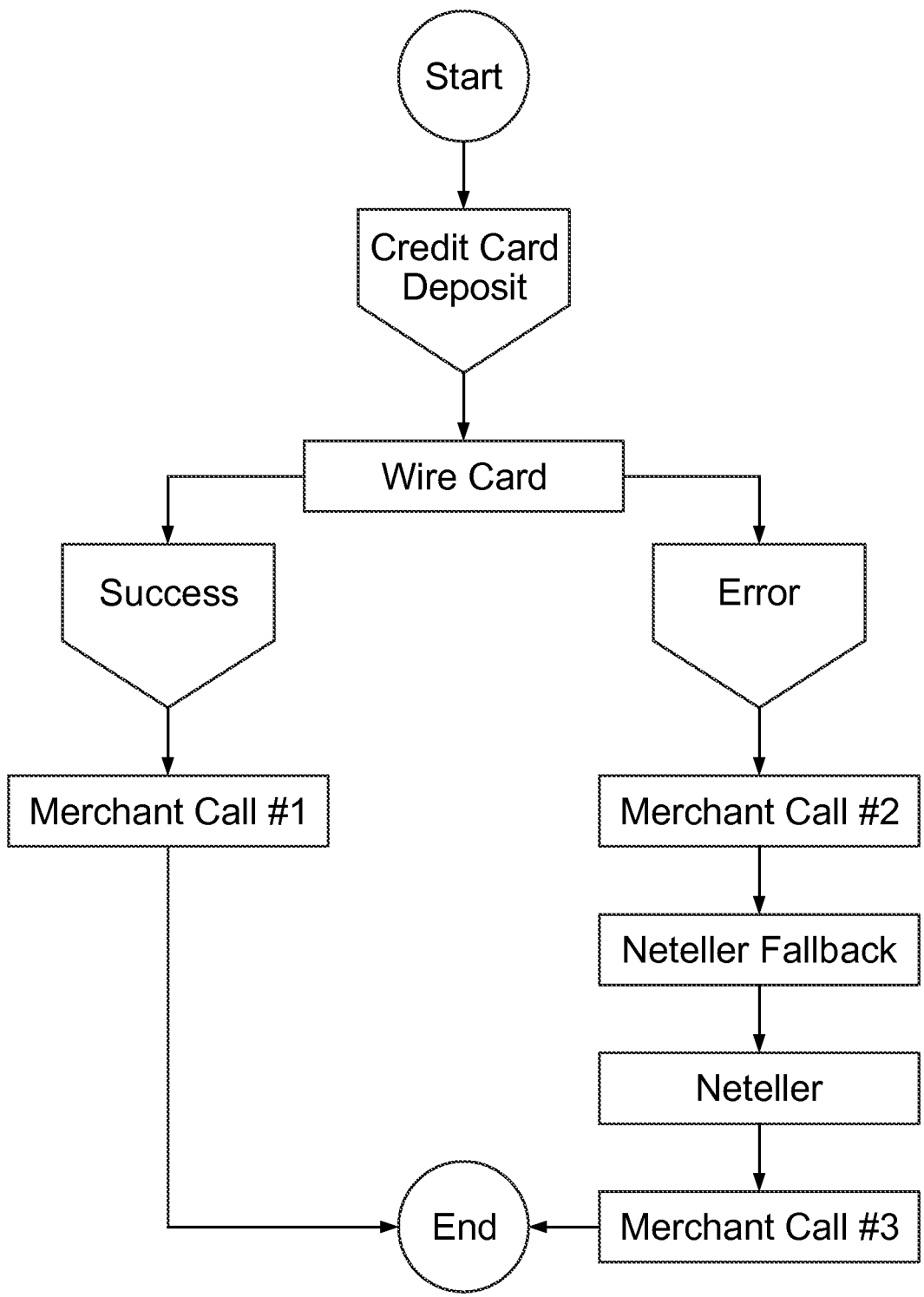
FIG. 5 is a schematic flow diagram illustrating a typical transaction flow in the system of FIG. 1.

FIG. 5 illustrates an example of a transaction workflow, which is configured to send a credit card transaction to a predefined credit card acquirer. Depending on the result from the acquirer, the transaction flow is then terminated or, in the event of a negative result, sent to an alternative solution.

Thus, workflows are a crucial element of gateway platform according to an exemplary embodiment of the present invention, and essentially comprise roadmaps or paths that tell the Workflow Engine what to do and where to go for every given request, and, due to the nature and underlying technical concept associated with the creation of workflows described herein, the Workflow Engine can be configured to process many rules, e.g. over 300 rules per second, on a single server.

Figure 6A:
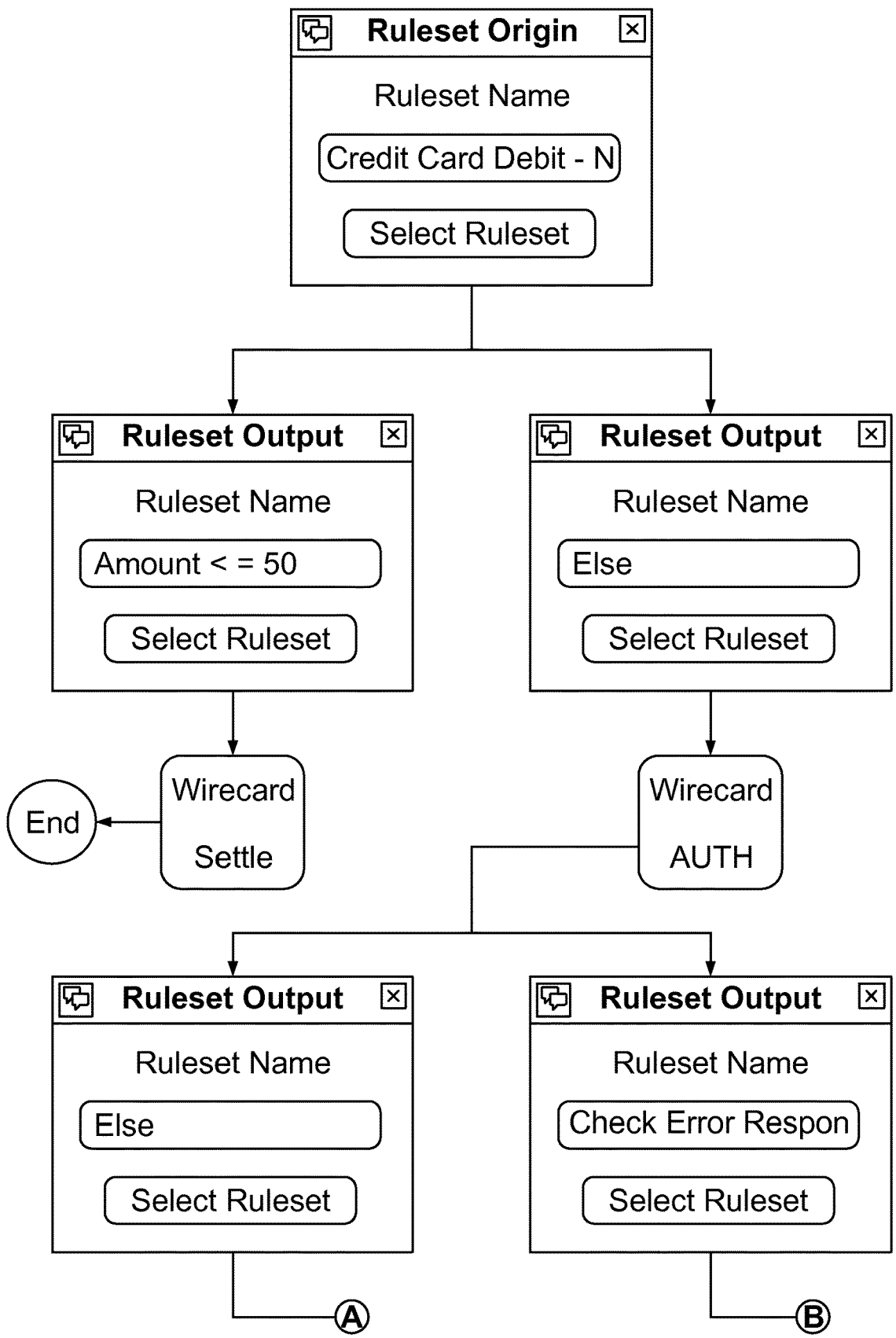
FIG. 6A is a schematic illustration of a transaction flow created in a workflow editor for use in apparatus according to an exemplary embodiment of the present invention.
Figure 6B:
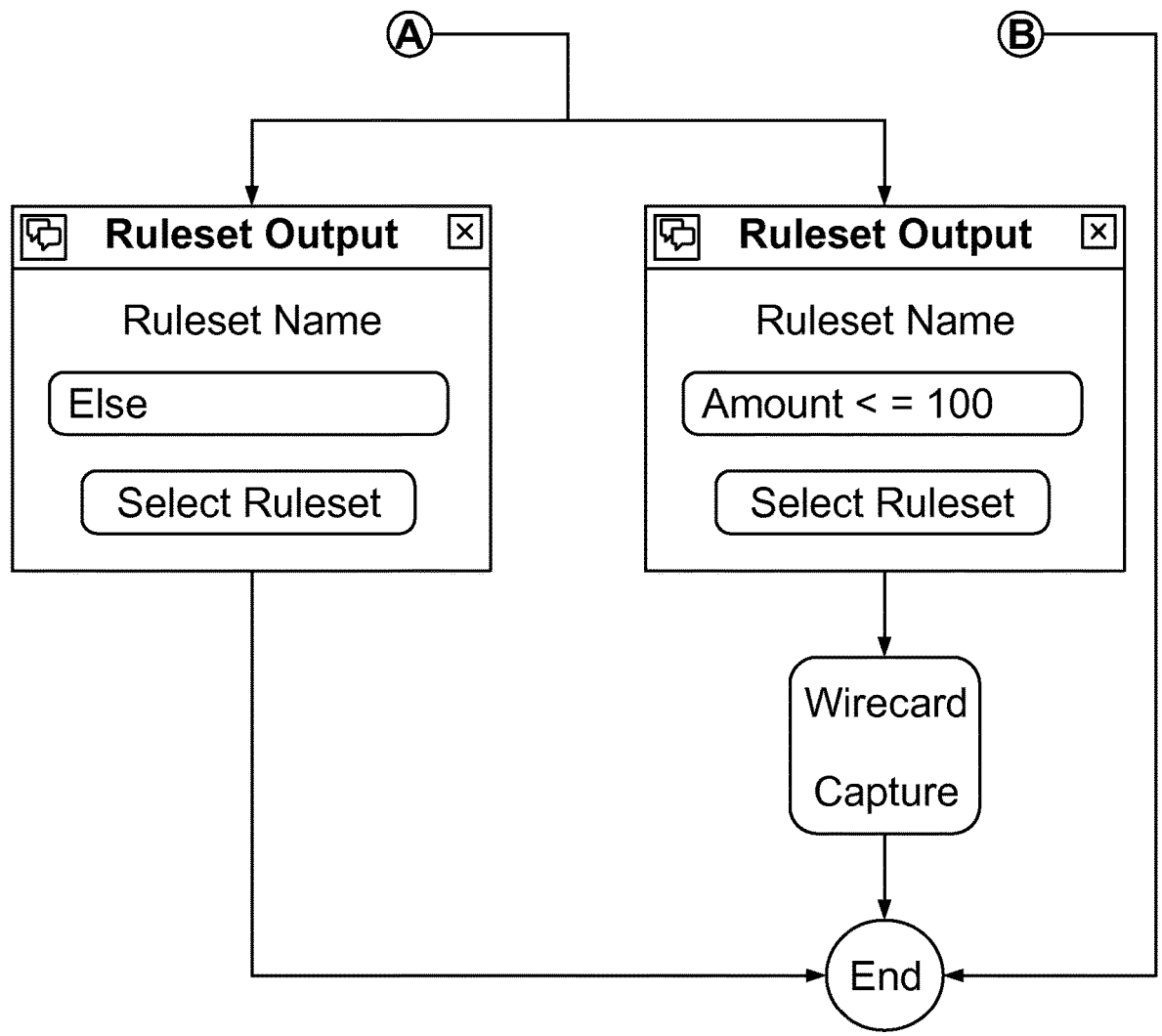
FIG. 6B is a schematic illustration of a transaction flow created in a workflow editor for use in apparatus accordingly to an exemplary embodiment of the present invention.
Figure 7:
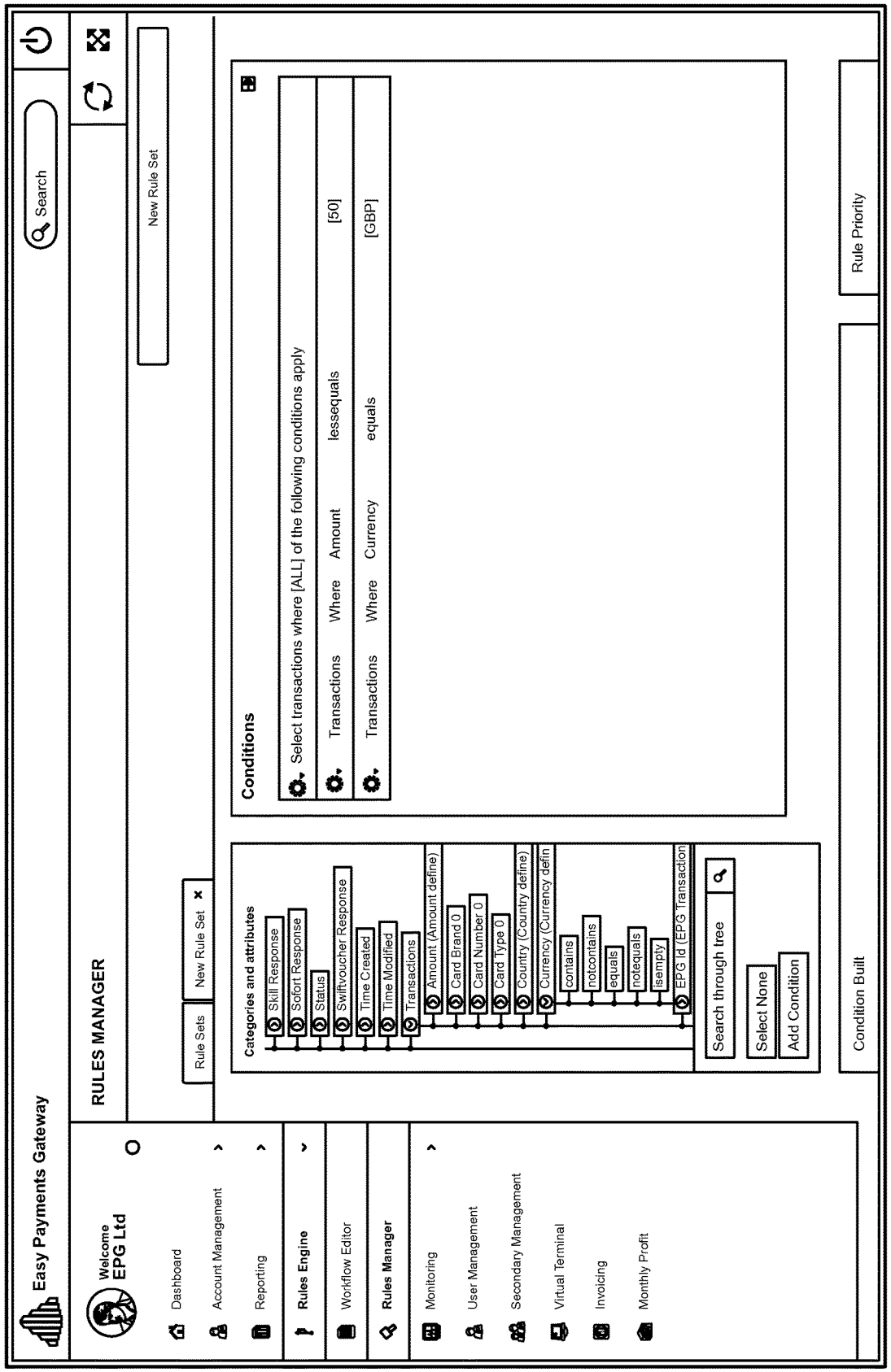
FIG. 7 is a screen shot of a Back Office rules editor for use in apparatus according to an exemplary embodiment of the present invention.

A Workflow Engine, incorporated into the Back Office, includes a workflow editor, that provides the user interface that enables a user to simply and quickly configure and reconfigure workflows, using visual display elements including modules and rule sets, and the link them together in an intuitive manner. FIG. 6 shows a transaction route created by the above-mentioned work flow editor for a merchant. Merchants can very easily create such workflows by dragging an appropriate action box onto the main 'canvas'. Rules are created using a simple interface (see FIG. 7), where conditions can be created using any parameter stored in the data base or passed in by the merchant via the application program interface (API). Lines are drawn to connect each action box to the appropriate rule set.

Figure 8A:
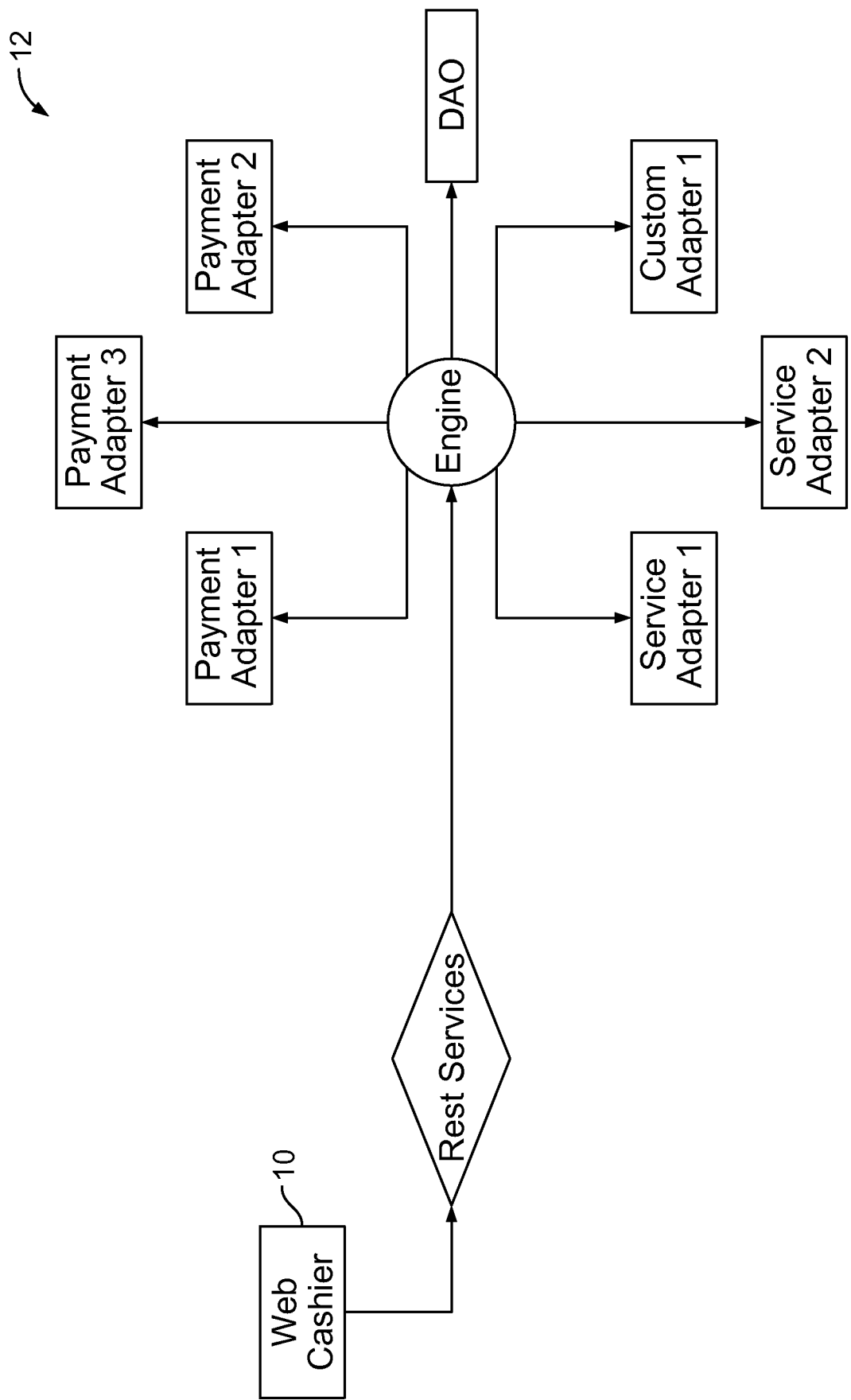
FIG. 8A is a schematic high level overview of apparatus according to an exemplary embodiment of the present invention.

There are many types of flows that can be created using the EPG platform. Below is a small example of the most typical flows that may be possible using a platform according to an exemplary embodiment of the present invention:

Least Cost Routing
Transactions can be routed to multiple acquirers based on processing costs
Volume Based Routing
Transactions can be routed to different acquirers to reach a certain amount of volume and then easily switched to route to a different acquirer
Round Robin
Transactions can be routed to different acquirers based on a counter
Identity Checks
Customer registrations or payments can be routed to an identity check service for address verification or age checks. Based on the response the merchant can decide to either terminate the request or continue
Declines
Transactions can be routed to various acquirers or alternative solutions based on declines. In other words, if an acquirer declines, the same request can be attempted in real time with another/multiple acquirers
Third Party Platforms
Sometimes merchants need to send data to a third party acquirer. This can be done as part of a flow for any type of request (customer registration, payments, transfers etc)
Reporting Databases
Calls can be made as part of any request to internal or third party reporting/back up databases in real time for data replication or back ups
Fail Overs
Different acquirers or payment solutions can be linked to a single flow in case of fail over.
Alternative Solutions
Merchants can route to any of the payment solutions integrated into the EPG platform based on different conditions such as amount, country, currency, age of account, etc A high level overview of the Engine architecture is illustrated in FIG. 8A of the drawings. It is important to note here that the Web Cashier can be in a different machine, completely separated from the rest of the system, this kind of decision depends in the deployment strategy of the merchant. We recommend the cashier in a separate machine, because in case of denegation of service attack, instance of the cashier under the attack (we can have multiple instances without any issue) can be disconnected and the flow can continue without affecting the core system. So, when Rest Services Module receives the call, it parses the information, validates that all the required fields for a standard transaction are in place, and if all goes fine, it will call the engine that will be in charge of performing the operations.

Workflow Engine

There are four principal concepts based in how an engine of a gateway system according to an exemplary embodiment of the present invention works:

Steps: An Adapter's operation execution, like Credit Card Authorization, where Credit Card is the adapter, and Authorization is the Operation.
Rules: Each one of the rules that can be defined over the request or the result of each step (for example, the currency is GBP, the amount is greater than 100, the payment method selected is Credit Card or even the result of the Code parameter from the 3D Secure enrolment verification is Yes are example of rules.)

Rule Sets: A set of Rules, they have a related Priority, so if two Rule Sets applies to an entry we can always decide which one we are going to use. (In the case we have two with the same priority, because in the database they are ordered, we will get the first one that comes in the list).

Links: A link between two steps, defines the path to follow if a rule set applies With these four elements, it is possible to define flows and how the system is going to work. A typical engine process scenario is defined by the following algorithm (this is a simplified version just for general understanding):

Obtain all the links that define a starting point of the system; they provide the rule sets in order of priority.

Using the RequestBean (that is the system input data) that arrives from the RestService, an iteration is performed over the rule sets to check if there are any of them that match an entered request. In this case, one of two scenarios may ensue:

If the request cannot be matched, an error is raised, because the system is expected to be able to handle all the requests; or There is a match, and then the step will be performed. For that, the adapter is accessed and the operation run (both things are stated in the Step)

From the last step, the response from the Adapter and the original response the flow will try to get the next step, and the process continues getting steps and running operations until a path can no longer be found.

Figure 8B:
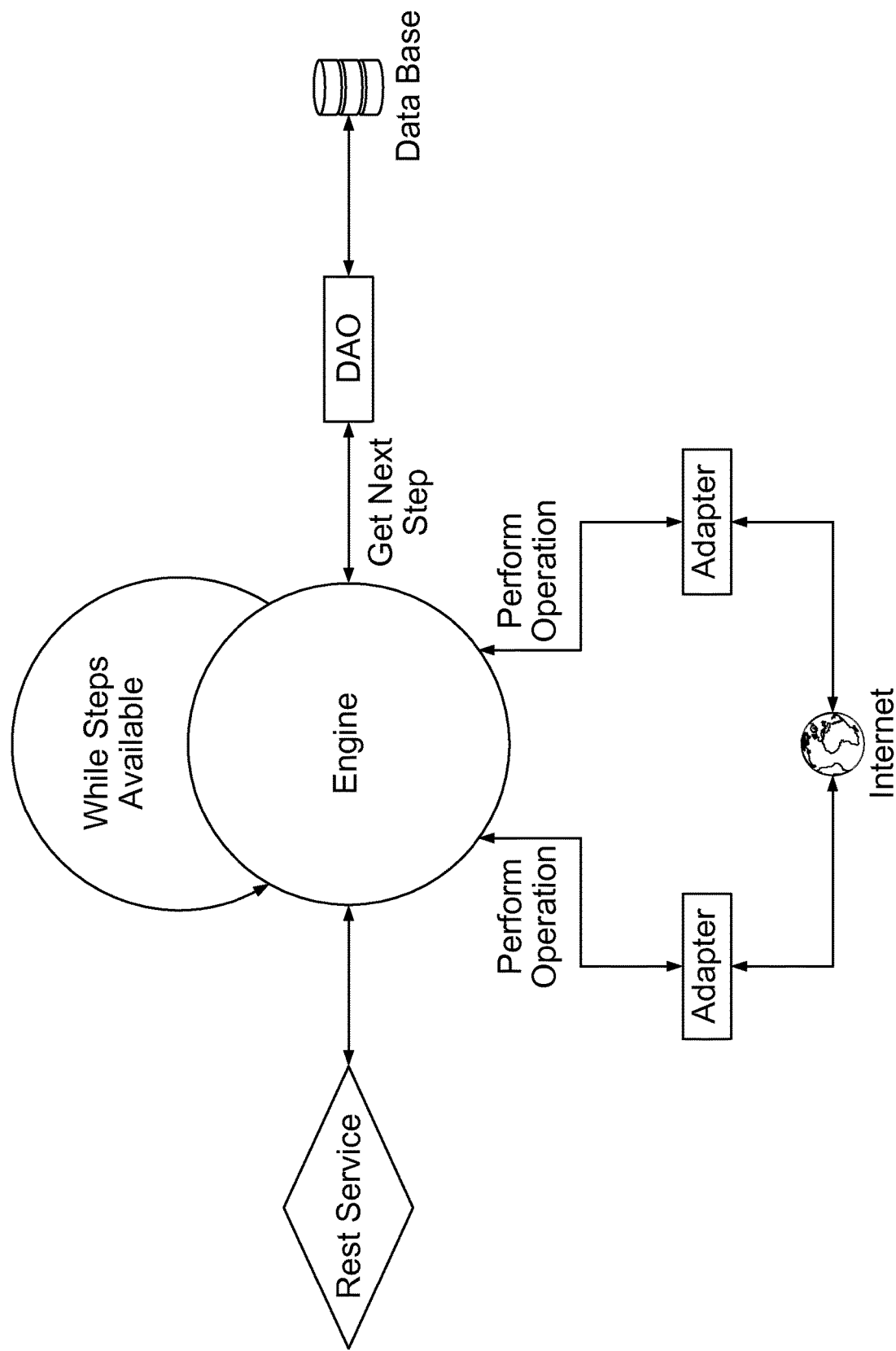
FIG. 8B is a schematic diagram illustrating the manner in which the gateway engine of an exemplary embodiment of the present invention operates.

Graphically, in the Back Office (that is the part of the system in charge of creating the flows, steps, rules, rule set and links), the above-described process will look like the screen shot shown in FIG. 8B.

Back Office Integration

The back office itself has its own Rest Service and the Back Office Engine and is in charge of creating and managing all of the components as dictated by the back office, directly talking with the DAO. Occasionally, the back office may need to perform some operations over the system in real time, like a rebate for example, hence why there is a link between the Back Office Engine and the Rest Services for the engine. This enables operations to be executed in real time via the back office. The back office and the main engine may be decoupled in this way because the back office does not need to be deployed where the Engine is. The most important thing about this exemplary infrastructure is that the manner in which it is being developed is independent of the server where it will be run. There is no dependence on any libraries provided by the Application Server (or Servlet Container in the case of Tomcat), bespoke libraries can be provided.

The database follows a very simple structure of tables without any kind of store procedures or complex types, so it is possible to port to any database very quickly, and, in a case where MyBatis is used as database framework in the server side, to change the database is effectively as simple as changing some configuration files, so any need can be adapted to in a straightforward manner. In a case where Tomcat may be used, the situation is similar: it is possible to migrate very easily to any Application server, as JBoss for example if required, because there is no dependence on the server libraries.

Database Design

A platform according to an exemplary embodiment of the present invention may be using a star schema design in its database. Thus, it will use a variety of tables that may be configured to allow for the storing of every single detail available per request, be it a payment or a service request. Apart from the request details any customer payment details will also be stored in the platform. External references will also be stored in its associated dimension table that can be used for external calls or simply for reporting purposes. The relationship between all the data relating to a request and or customer will be maintained throughout the database.

Access to this data may be available only to the EPG platform via encrypted passwords and secure connections. Merchants will be able to access this data via the back office however certain data will be restricted to specific account types. So merchants will be able to create back office accounts for their internal users based on different security levels. In some exemplary embodiments, only certain processes will be able to read and write into the database thus limiting what exactly has access to this data significantly. Even these processes will only be able to access the database if they provide the required credentials and the call is made from a secure and accepted IP address. This will ensure that the communication between the different components within the platform is secure and will also help in preventing any external attacks or breaches. Using a star schema allows the use of one main transaction table (the fact table) that contains the canonical payment and service data model and allows for quick reporting. This table will be linked to many other tables (dimensions) that will extend the transaction data model further. However more importantly because of the nature of the schema design and the fact that many dimension tables may be offered, such as a date table, merchants will be able to run extensive reports using any or all of the data provided in our database without the need for complex sql statements. The canonical model is used throughout the platform and makes it more lightweight and easier to pass around the platform with only the specific payment or account details requested when and if they are needed.

It will be appreciated by a person skilled in the art that the functionality of the proposed system can be implemented in a number of different ways, and the present invention is not necessarily intended to be limited in this regard. However, for completeness, it is envisaged that Spring Security, a Java EE framework that provides authentication, authorisation and other security features can be used to control the security aspects of a gateway system according to an exemplary embodiment of the present invention. The gateway system is intended to perform high level control and encryption of the operations and these can be audited. Passwords are encrypted within exemplary embodiments of the system, using for example one-way encryption algorithms (SHA1) and extensive access flow control may be provided. HTTPS, IP address blocking, SSL certificates and integrity checks may also be used to access the gateway application program interface.

Thus, whilst many different payment gateways exist in the prior art, the platform provided by aspects of the present invention is more than just a gateway, it is a fully integrated payment management platform of a type not previously envisaged. It allows a merchant to literally 'draw' the route for any request to any number of payment solutions, internal software processes or third party solutions, all in real time and without any specific IT skills being required.

The following is a non-exhaustive list of the (real time) functions and services that may be provided by a gateway system according to various aspects of the present invention, although it will be appreciated that any or all of the following functions and services may be provided in any one embodiment, and in any combination, and no limitation of the scope of the present invention is intended to be inferred or implied in respect of the following list of potential functions and services:

Thus, a gateway system according to an exemplary embodiment of the present invention allows for the creation of workflows with a very easy to use graphical tool that allows the user to drag and drop components and rule sets (conditions) into the flow, thus allowing for endless routes and combinations.

It may offer real time cashier configuration without the need to redeploy any code. Countries and currencies can be configured independently for each cashier.

The system can be configured to work with its own cashier or using the merchant's cashier, this means there is less integration required and is less obtrusive to the merchant's existing platform.

The system can be configured to work with its own integrated database or with the merchant's own database. There is no restriction to where the database is located.

The payment methods and other services offered by a system according to an exemplary embodiment of the present invention may all be treated as independent services. This means that the system can quickly and easily plug in any number of services the merchant requires. It also means that each service along with its relevant parameters and results can be used to create a report, filter, rule set.

The system may be self contained and does not require any external libraries which means that it can be very light weight and can be executed in virtually any environment as an off-the-shelf product.

The platform can be hosted locally on a merchant's own data centre on any number of servers or it can be hosted on a cloud server if desired.

In some exemplary embodiments, the system may offer real time reporting as well as scheduled reporting for pre-defined reports that can be downloaded in, for example, HTML, PDF, CSV or Excel format.

The system can be configured to offer real time live monitoring of transactions with filtering that enables the user to either colour code (high light) or hide any transactions based on any number of conditions created by the merchant.

The system can be configured to offer full transaction searching and full transaction detail viewing.

It can be configured to offer geo location of customer as well as historic transaction geo location mapping to track the path of a customer through the world.

The system can be configured to offer full bin range mapping and geo location of credit cards; and may provide a secondary management tool that allows merchants to group any number of pending customer payouts. This tool also allows merchants to perform delayed captures of pending transactions either manually or automated through the use of rules and conditions previously created by the merchant.

A real time dashboard can be offered with widgets that can be configured by the merchant to show any predefined amount of data over any period of time.

The system can be fully audited and may be completely role and permission based, meaning every section and piece of functionality can be limited to specific roles and permissions.

The system may offer credit card tokenization, limiting the level of PCI required by the merchant; it may also offer a Virtual Terminal that allows merchants to perform MOTO transactions on behalf of their customers.

The platform can be configured to access via a direct API or via a redirect API.

It will be appreciated by a person skilled in the art, from the foregoing description, that modifications and variations can be made to the described embodiments without departing from the scope of the invention as defined by the appended claims.

The invention claimed is:

1. A computer-implemented transaction gateway system for effecting a financial transaction request in an electronic payment system, the system being configured to receive financial transaction request data, select, based on said financial transaction request data, one of a plurality of payment workflows to be performed that defines a financial transaction data route specified in said payment workflow, wherein said system comprises a computer-implemented payment workflow processing engine, a computer-implemented back office module communicably coupled to said payment workflow processing engine, a computer-implemented web cashier module remote from, and communicably coupled to, said payment workflow processing engine, and a database, said payment workflow processing engine being communicably coupled to said database;

said back office module comprising a graphical payment workflow editor having a user interface being configured to display, on a screen, a payment workspace within which a user can configure a payment workflow comprising financial transaction service provider functions, rules and payment workflow paths, and a plurality of graphical elements, each defining respective financial transaction service provider functions or rule sets, which can be selected by a user, via said user interface, and added to, removed from or moved within said displayed workspace, each rule set graphical element having associated therewith a rule set defining user-selectable conditions to be fulfilled for a respective financial transaction service provider function to be performed such that a user can select, via said user interface, combinations of graphical elements and respective one or more rules to be displayed within said workspace; said payment workflow editor being further configured to enable a user to selectively define, within said displayed workspace, visual links between said graphical elements to define respective payment workflow paths and display a resultant user-configured payment workflow on said screen in the form of a representative graphical image;

said payment workflow processing engine being configured to receive from said back office module, and store, payment workflow data representative of a plurality of user-configured payment workflows, said payment workflow data defining a respective set of steps each associated with respective financial transaction service provider functions to be performed by a financial transaction provider specified therein in order of priority defined by said visual links and in accordance with said respective rule sets;

said database having stored therein executable financial transaction data associated with each of said financial transaction service provider functions;

said web cashier module being configured to allow a user to select a payment workflow and transmit request data representative thereof to said payment workflow processing engine;

said payment workflow processing engine being further configured to:

in response to receipt of said request data, retrieve identity data representative of a respective selected payment workflow;

in respect of each step thereof, and in order of priority, repeatedly: retrieve from said database, and action, respective executable financial transaction data in respect of a respective financial transaction service provider specified in said selected workflow, until no further steps are defined; and receive data representative of a result of a performance of said selected payment workflow by and from said financial transaction service provider and transmit corresponding data to said web cashier module.

2. A system according to claim 1, wherein said payment workflow processing engine is configured to identify two or more contradictory rule sets in a selected payment workflow.

3. A system according to claim 2, wherein said payment workflow processing engine is configured to select, based on the priority values of said contradictory rule sets, one of said contradictory rule sets for execution in said payment workflow.

4. A system according to claim 3, wherein said payment workflow processing engine is configured to generate, for display, an error message in the event that it identifies two or more contradictory rule sets in a payment workflow.

5. A system according to claim 1, wherein said back office module is configured to enable a user to define one or more rule sets.

6. A system according to claim 1, wherein said back office module is configured to enable a user to define one or more rule sets in respect of a single rule set graphical element by displaying data representative of selectable conditional statements, and enabling a user to select one or more conditional statements and enter specified parameters in respect thereof.

7. A system according to claim 1, wherein said payment workflow processing engine and said back office module are communicably coupled for two-way communication via a REST service.

8. A system according to claim 1, wherein predefined said rule sets and said graphical elements are stored in a database accessible by said processing engine and/or said back office module.

9. A method of generating a financial transaction data route for directing and effecting a financial transaction request in a system according to claim 1, the method comprising:

providing said back office module with a graphical payment workflow editor having a user interface and being configured to display, on a screen, a workspace within which a user can configure a payment workflow comprising service provider functions, rules and payment workflow paths, and a plurality of graphical elements, each defining respective service provider functions or rule sets which can be selected by a user, via said user interface, and added to, removed from, or moved within said displayed workspace, each rule set graphical element having associated therewith a rule set defining user-selectable conditions to be fulfilled for a respective service provider function to be performed, such that a user can select, via said user interface, combinations of graphical elements and respective one or more rules to be displayed within said workspace, said payment workflow editor being further configured to enable said user to selectively define within said displayed workspace, visual links between said graphical elements to define respective payment workflow paths and display a resultant user-configured payment workflow on said screen in the form of a graphical image;

configuring said payment workflow processing engine to receive from said back office module, and store, payment workflow data representative of a plurality of user-configured payment workflows, said payment workflow data defining a respective set of steps each associated with respective service provider functions to be performed by said financial transaction provider specified therein in order of priority defined by said visual links and in accordance with said respective rule sets;

storing in said database executable financial transaction data associated with each of said service provider functions;

configuring said web cashier module to allow a user to select a payment workflow and transmit request data representative thereof to said payment workflow processing engine; and further configuring said payment workflow processing engine to:

in response to receipt of said request data, retrieve identity data representative of a selected payment workflow;

in respect of each step thereof, and in order of priority, repeatedly retrieve from said database, and action, respective executable financial transaction data in respect of a respective financial transaction service provider specified in said selected payment workflow, until no further steps are defined; and retrieve data representative of a result of performance of said selected payment workflow by and from said financial transaction service provider and transmit corresponding data to said web cashier module.

10. A system according to claim 1, wherein said payment workflow processing engine is configured to perform a user authentication operation in response to authentication data received via said web cashier module.

* * * * *